(12) United States Patent
Wan

(10) Patent No.: US 10,180,923 B2
(45) Date of Patent: Jan. 15, 2019

(54) CONNECTING DEVICE AND TRANSMITTING SYSTEM USING THE SAME

(71) Applicant: NANNING FUGUI PRECISION INDUSTRIAL CO., LTD., Nanning (CN)

(72) Inventor: Wen-Bo Wan, Shenzhen (CN)

(73) Assignee: NANNING FUGUI PRECISION INDUSTRIAL CO., LTD., Nanning (CN)

( * ) Notice: Subject to any disclaimer, the term of this patent is extended or adjusted under 35 U.S.C. 154(b) by 0 days.

(21) Appl. No.: 15/376,821

(22) Filed: Dec. 13, 2016

(65) Prior Publication Data
US 2018/0157608 A1   Jun. 7, 2018

(30) Foreign Application Priority Data
Dec. 5, 2016   (CN) .......................... 2016 1 1105027

(51) Int. Cl.
| | | |
|---|---|---|
| *G06F 13/12* | (2006.01) | |
| *G06F 13/00* | (2006.01) | |
| *G06F 13/364* | (2006.01) | |
| *G06F 13/42* | (2006.01) | |
| *G06F 13/40* | (2006.01) | |

(52) U.S. Cl.
CPC .......... *G06F 13/364* (2013.01); *G06F 13/404* (2013.01); *G06F 13/4282* (2013.01)

(58) Field of Classification Search
CPC ........ G06F 21/554; G06F 13/36; G06F 13/40; G06F 13/4027; G06F 13/4081; G06F 2213/0042; G06F 13/364; G06F 13/404; G06F 13/4282; H01R 24/60; H01R 2107/00

See application file for complete search history.

(56) References Cited

U.S. PATENT DOCUMENTS

| | | | | |
|---|---|---|---|---|
| 7,174,408 B2 * | 2/2007 | Ede | ..................... | G06F 13/4081 |
| | | | | 710/105 |
| 2004/0088449 A1 * | 5/2004 | Sakaki | .................. | G06F 13/385 |
| | | | | 710/15 |
| 2016/0132407 A1 | 5/2016 | Wu | | |

FOREIGN PATENT DOCUMENTS

| | | |
|---|---|---|
| TW | M472936 U | 2/2014 |
| TW | 201617869 A | 5/2016 |

OTHER PUBLICATIONS

On-The-Go and Embedded Host Supplement to the USB Revision 2.0 Specification; Jul. 14, 2011; Revision 2.0; pp. i-80 (Year: 2011).*

* cited by examiner

*Primary Examiner* — Idriss N Alrobaye
*Assistant Examiner* — Richard B Franklin
(74) *Attorney, Agent, or Firm* — ScienBiziP, P.C.

(57) ABSTRACT

A connecting device able to allocate master and slave roles between two intelligent devices having On-The-Go functions, depending on the intelligent device connects at a first point in time to one of two connectors, the connecting device also includes a control circuit connected between the two connectors. The control circuit between the connectors maintains and controls the master-slave relationship between the two intelligent devices.

15 Claims, 2 Drawing Sheets

CONNECTING DEVICE AND TRANSMITTING SYSTEM USING THE SAME

FIELD

The subject matter herein generally relates to transmitting systems with connecting devices.

BACKGROUND

Intelligent mobile devices with OTG (On-The-Go) function can transmit data or charge among each other. Many intelligent mobile devices are unable to set a master-slave relationship between two intelligent mobile devices.

BRIEF DESCRIPTION OF THE DRAWINGS

Implementations of the present technology will now be described, by way of example only, with reference to the attached figures.

DETAILED DESCRIPTION

Figure 1:
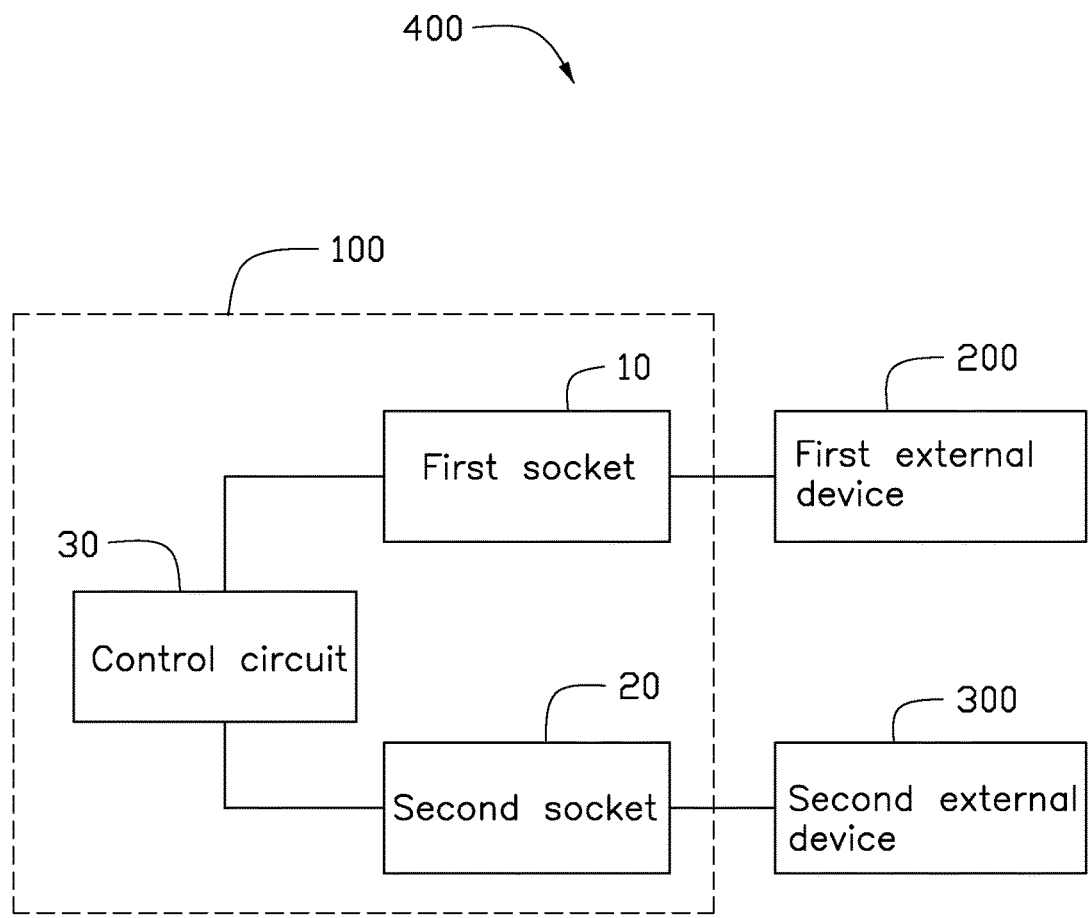
FIG. 1 is a schematic diagram of an embodiment of a transmitting system with a connecting device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising" means "including, but not necessarily limited to"; it specifically indicates open-ended inclusion or membership in a so-described combination, group, series, and the like.

FIG. 1 illustrates a transmitting system 400 of an embodiment of the present disclosure.

The transmitting system 400 comprises a connecting device 100, a first external device 200, and a second external device 300. The connecting device 100 is configured to transmit data or charge electricity between the first external device 200 and the second external device 300.

The connecting device 100 comprises a first socket 10, a second socket 20, and a control circuit 30. The control circuit 30 is coupled between the first socket 10 and the second socket 20.

The first socket 10 is electrically coupled to the first external device 200. The second socket 20 is electrically coupled to the second external device 300.

In at least one embodiment, both the first socket 10 and the second socket 20 are a micro USB (Universal Serial Bus) connector, and both the first external device 200 and the second external device 300 have OTG (On-The-Go) function.

The control circuit 30 sets a master-slave relationship between the first external device 200 and the second external device 300 according to the order in which the first external device 200 and second external device 300 may be inserted into one of the first socket 10 and the second socket 20.

When the first external device 200 is inserted into the first socket 10 as a first step and the second external device 300 is later inserted into the second socket 20, the control circuit 30 sets the first external device 200 as a host device, and the control circuit 30 sets the second external device 300 as a slave device.

When the second external device 300 is inserted into the second socket 20 as a first step and the first external device 200 is later inserted into the first socket 10, the control circuit 30 sets the second external device 300 to be a host device, and the control circuit 30 sets the first external device 200 to be a slave device.

Figure 2:
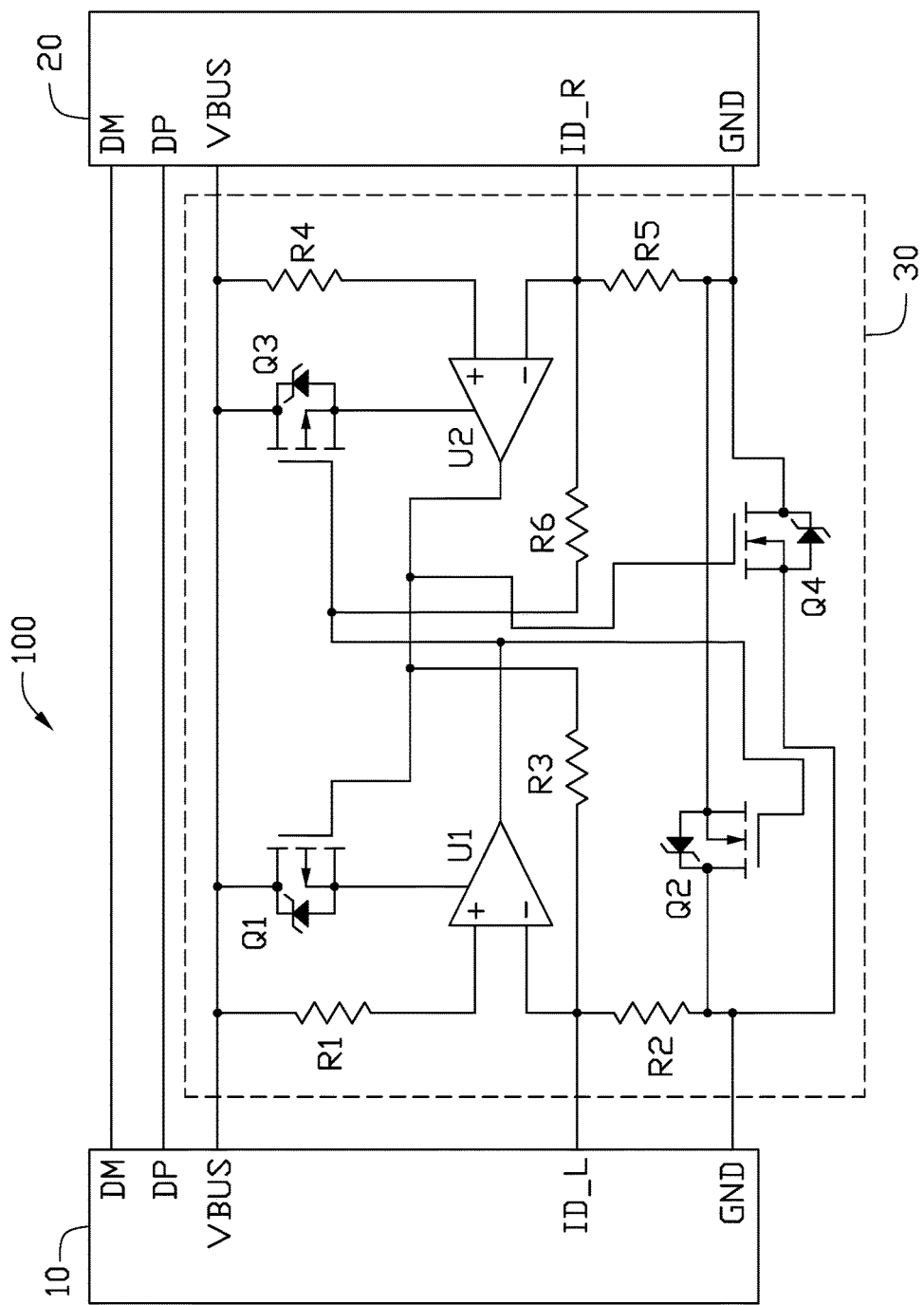
FIG. 2 is a circuit diagram of the connecting device of FIG. 1.

FIG. 2 illustrates that the first socket 10 comprises a first data pin DM, a second data pin DP, a power pin VBUS, a state pin ID_L, and a ground pin GND. The second socket 20 comprises a first data pin DM, a second data pin DP, a power pin VBUS, a state pin ID_R, and a ground pin GND. The first data pin DM, the second data pin DP, and the power pin VBUS of the first socket 10 are electrically coupled to the first data pin DM, the second data pin DP, and the power pin VBUS of the second socket 20, respectively. Both the state pin ID_L of the first socket 10 and the state pin ID_R of the second socket 20 are electrically coupled to the control circuit 30.

The control circuit 30 comprises first to fourth electronic switches Q1-Q4, a first comparator U1, a second comparator U2, and first to sixth resistors R1-R6.

A first terminal of the first electronic switch Q1 is electrically coupled to the power pin VBUS of the first socket 10. A second terminal of the first electronic switch Q1 is electrically coupled to a power terminal of the first comparator U1. A third terminal of the first electronic switch Q1 is electrically coupled to an output terminal of the second comparator U2. A first input terminal of the first comparator U1 is electrically coupled to the power pin VBUS of the first socket 10 through the first resistor R1. A second input terminal of the first comparator U1 is electrically coupled to the state pin ID_L of the first socket 10. The second input terminal of the first comparator U1 is also electrically coupled to the ground pin GND of the first socket 10 through second resistor R2. An output terminal of the first comparator U1 is electrically coupled to a first terminal of the second electronic switch Q2.

A second terminal of the second electronic switch Q2 is electrically coupled to the ground pin GND of the first socket 10. A third terminal of the second electronic switch Q2 is electrically coupled to the ground pin GND of the second socket 20. A first terminal of the third electronic switch Q3 is electrically coupled to the power pin VBUS of the second socket 20. A second terminal of the third electronic switch Q3 is electrically coupled to a power terminal of the second comparator U2. A third terminal of the third electronic switch Q3 is electrically coupled to the output terminal of the first comparator U1. The third terminal of the third electronic switch Q3 is also electrically coupled to the state pin ID_R of the second socket 20 through the sixth resistor R6.

A first input terminal of the second comparator U2 is electrically coupled to the power pin VBUS of the second socket 20 through the fourth resistor R4. A second terminal of the second comparator U2 is electrically coupled to the state pin ID_R of the second socket 20. The second terminal of the second comparator U2 is also electrically coupled to the ground pin GND of the second socket 20 through the fifth resistor R5. An output terminal of the second comparator U2 is electrically coupled to the state pin ID_L of the first socket 10 through third resistor R3, and the output terminal of the second comparator U2 is also electrically coupled to a first terminal of the fourth electronic switch Q4. A second terminal of the fourth electronic switch Q4 is electrically coupled to the ground pin GND of the second socket 20. A third terminal of the electronic switch Q4 is electrically coupled to the ground pin GND of the first socket 10.

In at least one embodiment, the first electronic switch Q1 and the third electronic switch Q3 can be PMOS field effect transistors (FETs). Both the first terminal of the first electronic switch Q1 and the first terminal of the third electronic switch Q3 can be a source terminal of the PMOS FET. Both the second terminal of the first electronic switch Q1 and the second terminal of the third electronic switch Q3 can be a drain terminal of the PMOS FET. Both the third terminal of the first electronic switch Q1 and the third terminal of the third electronic switch Q3 can be a gate terminal of the PMOS FET.

In at least one embodiment, the second electronic switch Q2 and the fourth electronic switch Q4 can be NMOS FETs. Both the first terminal of the second electronic switch Q2 and the first terminal of the fourth electronic switch Q4 can be a gate terminal of the NMOS FET. Both the second terminal of the second electronic switch Q2 and the second terminal of the fourth electronic switch Q4 can be a source terminal of the NMOS FET. Both the third terminal of the second electronic switch Q2 and the third terminal of the fourth electronic switch Q4 can be a drain terminal of the NMOS FET.

Please refer to FIGS. 1 and 2, when the second external device 300 is inserted as a first connection into the second socket 20 and the first external device 200 is inserted into the first socket 10 later, the state pin ID_R of the second socket 20 receives a logic control signal at the low-voltage level, such as logic 0, from the ground pin GND of the second socket 20. The state pin ID_R of the second socket 20 is thus locked at the low-voltage level. The second external device 300 outputs a 5V power through the power pin VBUS of the second socket 20. The third electronic switch Q3 is turned on, and the second electronic switch Q2 is turned off. The output terminal of the second comparator U2 outputs a comparing signal at the high-voltage level, such as logic 1, to the first electronic switch Q1, the fourth electronic Q4, and the state pin ID_L of the first socket 10. At the same time, the first electronic switch Q1 is turned off, the first comparator U1 is turned off, and the state pin ID_L of the first socket 10 is locked at the high-voltage level.

The state pin ID_R of the second socket 20 is locked at the low-voltage level and the state pin ID_L of the first socket 10 is locked at the high-voltage level. The second external device 300 is thereby set to be the host device and the first external device 200 is set to be the slave device.

Based on the same principle, when the first external device 200 is inserted as a first connection into the first socket 10 early and the second external device 300 is later inserted into the second socket 20, the state pin ID_L of the first socket 10 receives the logic control signal at the low-voltage level from the ground pin GND of the first socket 10, and the state pin ID_L of the first socket 10 is locked at the low-voltage level. The first external device 200 outputs a 5V power through the power pin VBUS of the first socket 10. The first electronic switch Q1 is turned on, and the fourth electronic switch Q4 is turned off. The output terminal of the first comparator U1 outputs a comparing signal at the high-voltage level to the third electronic switch Q3, the second electronic Q2, and the state pin ID_R of the second socket 20. At the same time, the third electronic switch Q3 is turned off, the second comparator U2 is turned off, and the state pin ID_R of the second socket 20 is locked at the high-voltage level.

The state pin ID_L of the first socket 10 is thus locked at the low-voltage level and the state pin ID_R of the second socket 20 is locked at the high-voltage level. The first external device 200 is thereby set to be the host device and the second external device 300 is set to be the slave device.

The embodiments shown and described above are only examples. Many details are often found in the art such as the other features of connecting device. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A connecting device configured for coupling between a first external device and a second external device, and the connecting device comprising:
   a first socket comprising a first state pin, coupled to the first external device;
   a second socket comprising a second state pin, coupled to the second external device; and
   a control circuit coupled between the first socket and the second socket;
   wherein the control circuit is configured for setting a master-slave relationship between the first external device and the second external device according to the order the first external device is inserted into the first socket and the second external device is inserted into the second socket;
   wherein when the first external device is inserted into the first socket and the second external device is later inserted into the second socket, the state pin of the first socket is locked at a low-voltage level and the state pin of the second socket at a high-voltage level; when the second external device is inserted into the second socket and the first external device is later inserted into the first socket, the state pin of the first socket is locked at a high-voltage level and the state pin of the second socket at a low-voltage level.

2. The connecting device of claim 1, wherein when the first external device is inserted into the first socket and the second external device is later inserted into the second socket, the control circuit sets the first external device as a host device, and the control circuit sets the second external device as a slave device.

3. The connecting device of claim 2, wherein when the second external device is inserted into the second socket and the first external device is later inserted into the first socket, the control circuit sets the second external device as a host device, and the control circuit sets the first external device as a slave device.

4. The connecting device of claim 1, wherein the first socket and the second socket are micro universal serial bus connectors.

5. The connecting device of claim 1, wherein the first socket further comprises a first data pin, a second data pin, a power pin, and a grounded pin; the second socket comprises a first data pin, a second data pin, a power pin, and a grounded pin; the first data pin, the second data pin, and the power pin of the first socket are electrically coupled to the first data pin, the second data pin, and the power pin of the second socket respectively; both the first state pin of the first socket and the second state pin of the second socket are electrically coupled to the control circuit.

6. The connecting device of claim 5, wherein the control circuit comprises first electronic switches, a first comparator, a first resistor, a second resistor, and a third resistor; a first terminal of the first electronic switch is electrically coupled to the power pin of the first socket, a second terminal of the first electronic switch is electrically coupled to a power terminal of the first comparator, a third terminal of the first electronic switch is electrically coupled to the state pin of the first socket through the third resistor, a first input terminal of the first comparator is electrically coupled to the power pin of the first socket through the first resistor, a second input terminal of the first comparator is electrically coupled to the state pin of the first socket, the second input terminal of the first comparator is also electrically coupled to the grounded pin of the first socket through second resistor.

7. The connecting device of claim 6, wherein the control circuit further comprises a second electronic switch, a third electronic switch, a sixth resistor; an output terminal of the first comparator is electrically coupled to a first terminal of the second electronic switch; a second terminal of the second electronic switch is electrically coupled to the grounded pin of the first socket, a third terminal of the second electronic switch is electrically coupled to the grounded pin of the second socket, a first terminal of the third electronic switch is electrically coupled to the power pin of the second socket, a second terminal of the third electronic switch is electrically coupled to a power terminal of the second comparator, a third terminal of the third electronic switch is electrically coupled to the output terminal of the first comparator, the third terminal of the third electronic switch is electrically coupled to the state pin of the second socket through the sixth resistor.

8. The connecting device of claim 7, wherein the control circuit further comprises a fourth electronic switch, a fourth resistor, and a fifth resistor; a first input terminal of the second comparator is electrically coupled to the power pin of the second socket through the fourth resistor, a second terminal of the second comparator is electrically coupled to the state pin of the second socket, the second terminal of the second comparator is electrically coupled to the grounded pin of the second socket through the fifth resistor, an output terminal of the second comparator is electrically coupled to the state pin of the first socket through the third resistor, the output terminal of the second comparator is electrically coupled to a first terminal of the fourth electronic switch, a second terminal of the fourth electronic switch is electrically coupled to the grounded pin of the second socket, a third terminal of the electronic switch is electrically coupled to the grounded pin of the first socket.

9. The connecting device of claim 8, wherein both the first electronic switch and the third electronic switch are a PMOS field effect transistors (FETs); the first terminal of the first electronic switch and the first terminal of the third electronic switch are a source of the PMOS FET; the second terminal of the first electronic switch and the second terminal of the third electronic switch are a drain of the PMOS FET; the third terminal of the first electronic switch and the third terminal of the third electronic switch are a gate of the PMOS FET.

10. The connecting device of claim 9, wherein both the second electronic switch and the fourth electronic switch are a NMOS FET; both the first terminal of the second electronic switch and the first terminal of the fourth electronic switch are a gate of the NMOS FET; both the second terminal of the second electronic switch and the second terminal of the fourth electronic switch are a source of the NMOS FET; both the third terminal of the second electronic switch and the third terminal of the fourth electronic switch are a drain of the NMOS FET.

11. A transmitting system comprising a connecting device, a first external device, and a second external device, the connecting device comprising:
a first socket comprising a state pin, coupled to the first external device;
a second socket comprising a state pin, coupled to the second external device; and
a control circuit coupled between the first socket and the second socket;
wherein the control circuit is configured for setting a master-slave relationship between the first external device and the second external device according to the order the first external device is inserted into the first socket and the second external device is inserted into the second socket;
wherein when the first external device is inserted into the first socket and the second external device is later inserted into the second socket, the state pin of the first socket is locked at a low-voltage level and the state pin of the second socket at a high-voltage level; when the second external device is inserted into the second socket and the first external device is later inserted into the first socket, the state pin of the first socket is locked at a high-voltage level and the state pin of the second socket at a low-voltage level.

12. The transmitting system of claim 11, wherein when the first external device is inserted into the first socket and the second external device is later inserted into the second socket, the control circuit sets the first external device as a host device, and the control circuit sets the second external device as a slave device.

13. The transmitting system of claim 12, wherein when the second external device is inserted into the second socket and the first external device is later inserted into the first socket, the control circuit sets the second external device as a host device, and the control circuit sets the first external device as a slave device.

14. The transmitting system of claim 13, wherein the first socket and the second socket are a micro universal serial bus connector.

15. The transmitting system of claim 14, wherein the first external device and the second external device are an electronic device have OTG (On-The-Go) function.

* * * * *